(12) United States Patent
Advani et al.

(10) Patent No.: US 10,524,421 B2
(45) Date of Patent: Jan. 7, 2020

(54) METHODS AND APPARATUS TO SENSE THE WEIGHT OF GRAIN IN A GRAIN ELEVATOR

(71) Applicant: Deere & Company, Moline, IL (US)

(72) Inventors: Gurmukh Advani, West Fargo, ND (US); Ryan King, Fargo, ND (US); Noel W. Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 148 days.

(21) Appl. No.: 15/718,946

(22) Filed: Sep. 28, 2017

(65) Prior Publication Data

US 2019/0090420 A1 Mar. 28, 2019

(51) Int. Cl.
| | | |
|---|---|---|
| *A01D 41/127* | (2006.01) | |
| *G01G 19/52* | (2006.01) | |
| *A01D 61/00* | (2006.01) | |
| *G01L 5/04* | (2006.01) | |
| *A01F 12/46* | (2006.01) | |
| *G01G 17/04* | (2006.01) | |

(52) U.S. Cl.
CPC ......... *A01D 41/1272* (2013.01); *A01D 61/00* (2013.01); *A01F 12/46* (2013.01); *G01G 19/52* (2013.01); *G01L 5/04* (2013.01); *G01G 17/04* (2013.01)

(58) Field of Classification Search
CPC .......... A01D 41/1272; A01D 61/00–04; A01F 12/46; G01G 19/52; G01G 17/04; G01L 5/04
USPC ........................... 73/861, 861.73; 198/810.04
See application file for complete search history.

(56) References Cited

U.S. PATENT DOCUMENTS

| | | | | |
|---|---|---|---|---|
| 3,478,830 A | * | 11/1969 | Haeflein | G01G 11/043 177/16 |
| 5,318,475 A | * | 6/1994 | Schrock | A01D 41/1271 460/1 |
| 5,685,772 A | * | 11/1997 | Andersen | G01F 1/76 460/6 |
| 5,800,262 A | | 9/1998 | Andersen et al. | |

(Continued)

FOREIGN PATENT DOCUMENTS

| | | | | |
|---|---|---|---|---|
| BE | 2017/5398 | * | 6/2017 | ........... A01D 41/127 |
| EP | 3278652 A1 | | 2/2018 | |

(Continued)

OTHER PUBLICATIONS

Strainsert, "Standard Force Sensing Load Pins/Bolts, CPA/CBA Series," retrieved from Internet on Sep. 11, 2017, [http://www.strainsert.com/products/clevis-pins-bolts/], 2 pages.

(Continued)

*Primary Examiner* — Robert E Pezzuto
*Assistant Examiner* — Adam J Behrens
(74) *Attorney, Agent, or Firm* — Hanley, Flight & Zimmerman, LLC

(57) ABSTRACT

Methods and apparatus to sense the weight of grain in a grain elevator are disclosed. A disclosed example grain elevator includes a grain transport member to transport grain, a driving member to move the grain transport member, a first tension sensor to sense a first tension in the driving member, and a weight determiner to estimate a weight of the grain based on the first tension.

19 Claims, 5 Drawing Sheets

(56) References Cited

U.S. PATENT DOCUMENTS

| | | | |
|---|---|---|---|
| 5,863,247 A * | 1/1999 | Behnke | G01G 11/00 |
| | | | 460/114 |
| 6,584,424 B2 | 6/2003 | Hardt | |
| 8,636,140 B2 | 1/2014 | Tout et al. | |
| 9,311,586 B2 * | 4/2016 | Robinette | G08B 13/1427 |
| 9,372,109 B2 * | 6/2016 | Acheson | G01G 11/003 |
| 2014/0216894 A1 * | 8/2014 | Fourney | G01G 11/003 |
| | | | 198/340 |
| 2014/0262548 A1 | 9/2014 | Acheson et al. | |

FOREIGN PATENT DOCUMENTS

| | | | | |
|---|---|---|---|---|
| JP | 2007051892 | | 3/2007 | |
| WO | 2018219510 A1 | | 12/2018 | |
| WO | WO-2018219510 A1 * | | 12/2018 | A01F 12/46 |

OTHER PUBLICATIONS

Matthew Wayne Veal, "Enhanced Grain Crop Yield Monitor Accuracy Through Sensor Fusion and Post-Processing Algorithms", Doctoral Dissertation, University of Kentucky, 2006, 233 pages.

Strainsert, "Force Sensing Tension Links," retrieved from Internet on Sep. 11, 2017, [http://www.strainsert.com/product-categories/force-sensing-tension-links/], 1 page.

RFID Journal, "How Does Anti-Collision Work?", Mar. 1, 2012, retrieved from Internet on Sep. 25, 2017, [http://www.rfidjournal.com/blogs/experts/entry?9271], 1 page.

Prapassara Pupunwiwat, "Tag Anti-Collision Resolution for Improved Quality of RFID Data Streams," Doctoral Thesis, Griffith University, Sep. 2011, 196 pages.

Strainsert, "Standard Wire Rope Clevis Pins," retrieved from Internet on Sep. 11, 2017, [http://catalog.strainsert.com/viewitems/force-sensing-clevis-pins-bolts/spa-series-standard-wire-rope-clevis-pins], 3 pages.

Strainsert, "Standard Wire Rope Load Pins, SPA Series," retrieved from Internet on Sep. 11, 2017, [http://www.strainsert.com/products/wire-rope-clevis-pins], 2 pages.

Omega, "Practical Strain Gage Measurements," Agilent Technologies Inc., 1999, 37 pages.

Tension Measurement, Inc., "Tension Measurement Instruments," retrieved from Internet on Sep. 11, 2017, [http://www.tension-measurement.com/], 4 pages.

Tension Measurement, Inc., "Tension Sensors—Basic Principles and Application Design Considerations," Aug. 31, 2010, 12 pages.

Reyns et al., "A Review of Combine Sensors for Precision Farming," Precision Agriculture, Kluwer Academic Publishers, 2002, 14 pages.

European Patent Office, "Extended European Search Report," issued in connection with European Patent 4pplication No. 18196308.3, dated Feb. 22, 2019, 4 pages.

* cited by examiner

METHODS AND APPARATUS TO SENSE THE WEIGHT OF GRAIN IN A GRAIN ELEVATOR

FIELD OF THE DISCLOSURE

This disclosure relates generally to grain elevators, and, more particularly, to methods and apparatus to sense the weight of grain in a grain elevator.

BACKGROUND

Combine harvesters, also knowns as combines and harvesters, are agricultural machines used to harvest grain crops. Combine harvesters combine three separate harvesting operations: reaping, threshing, and winnowing into a single process. Combine harvesters includes a grain elevator to transport clean grain from a lower portion of the harvester upward into a grain tank.

Figure 1:
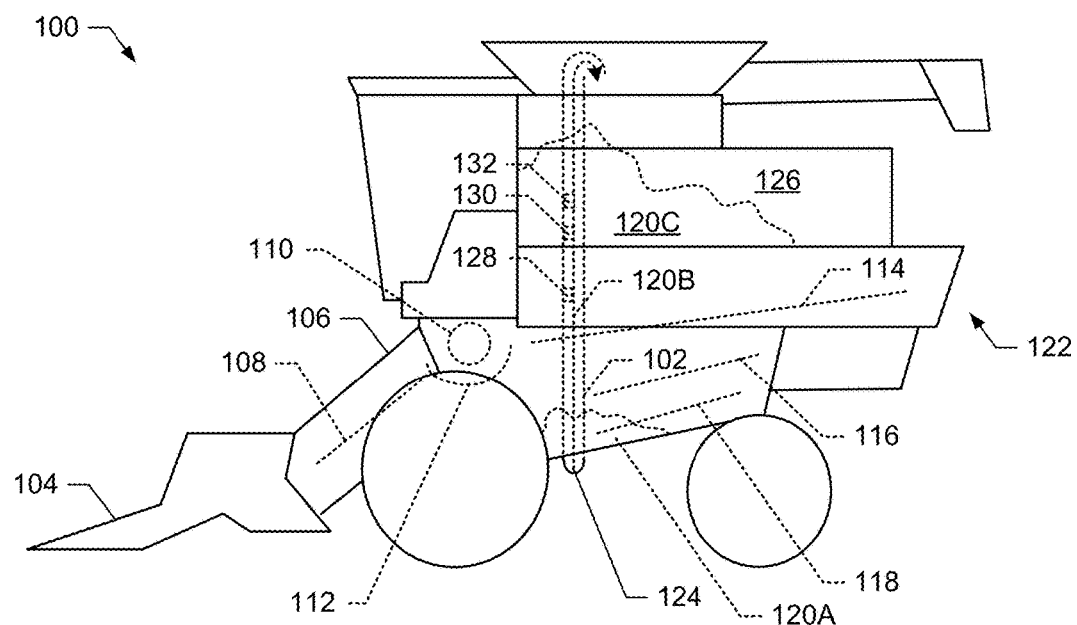
FIG. 1 illustrates an example combine harvester, in accordance with this disclosure, in which the weight of grain in a grain elevator can be sensed.

The figures are not to scale. Wherever possible, the same reference numbers will be used throughout the drawing(s) and accompanying written description to refer to the same or like parts. Connecting lines or connectors shown in the various figures presented are intended to represent example functional relationships and/or physical or logical couplings between the various elements. Use of terms such as up, down, top, bottom, side, end, front, back, etc. herein are used with reference to a currently considered or illustrated orientation. If they are considered with respect to another orientation, it should be understood that such terms must be correspondingly modified.

DETAILED DESCRIPTION

Reference will now be made in detail to non-limiting examples of this disclosure, examples of which are illustrated in the accompanying drawings. The examples are described below by referring to the drawings. Disclosed examples enable the weight of grain to be sensed in a grain elevator, thereby allowing the yield of grain to be sensed as the grain is harvested.

FIG. 1 illustrates an example combine harvester 100, in accordance with this disclosure, in which the weight of grain in an example grain elevator 102 can be sensed. The example combine harvester 100 of FIG. 1 engages a grain crop at an example grain platform (or header) 104 where the grain crop is cut and moved to an example feeder housing 106. The crop material and grain are conveyed on an example conveyor 108 through the feeder housing 106, and then passed between an example cylinder 110 and an example concave 112 where the material is threshed. As the threshed crop material passes over an example straw walker 114, an example chaffer 116, and/or an example sieve 118, cleaned grain 120A is filtered out and material other than grain (MOG) exits out an example rear 122 of the combine harvester 100 by way of mechanical conveyance, or is blown out by a fan. The cleaned grain 120A collects at the bottom of the combine harvester 100 where the cleaned grain 120A is conveyed via an example auger 124 to the example grain elevator 102.

The example grain elevator 102 transports (e.g., moves, transfers, etc.) grain 120B from the collected grain 120A at the grain auger 124 at a bottom of the combine harvester 100 to an example grain tank 126 to form a pile of conveyed grain 120C. As the grain 120B is transported by the grain elevator 102, a tension sensor 128 measures one or more values (e.g., voltages, currents, values representative thereof, etc.) one or more tensions in one or more driving members (e.g., a chain, a belt, a cable, a sprocket, a wheel, roller, etc.), one of which is designated at reference numeral 130, that move one or more grain transport members, one of which is designated at reference numeral 132, that move the grain 120B upward through the grain elevator 102 into the grain tank 126.

While an example combine harvester 100 is shown in FIG. 1 and described herein, the example methods and apparatus disclosed herein to sense (e.g., measure, weigh, detect, etc.) the weight of grain in a grain elevator are not limited to the example of FIG. 1. Instead, the example methods and apparatus disclosed here are applicable to grain elevators for other type(s) and/or configuration(s) of harvesters, and/or other type(s) and/or configuration(s) grain handling apparatus.

Figure 2:
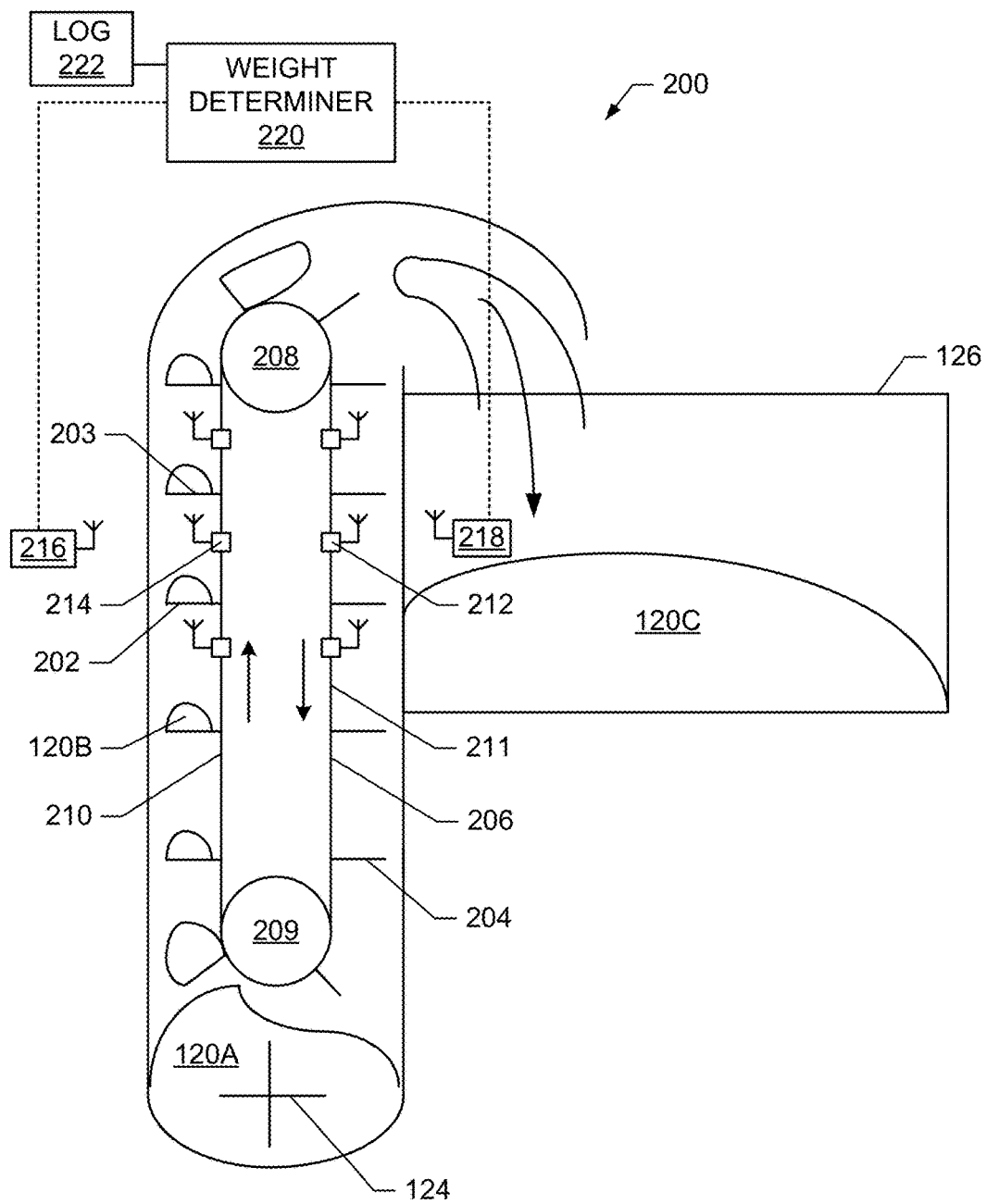
FIG. 2 is a schematic diagram of an example grain elevator, in accordance with this disclosure, in which the weight of grain in the grain elevator can be sensed.

FIG. 2 is a schematic diagram of an example grain elevator 200, in accordance with this disclosure, in which the weight of grain in the grain elevator can be sensed. The example grain elevator 200 of FIG. 2 can be used to implement the example grain elevator 102 of FIG. 1. The example grain elevator 200 transports (e.g., moves, transfers, etc.) the grain 120A collected at the grain auger 124 at a bottom of the combine harvester 100 to the example grain tank 126 to form a conveyed pile of gain 120C.

To transport the grain 120B, the example grain elevator 200 includes a plurality of grain transport members, three of which are designated at reference numerals 202, 203 and 204. Example grain transport members 202-204 include, but are not limited to, paddles, scoops, cups, buckets, etc.

To move the example grain transport members 202-204, the example grain elevator 200 includes one or more example driving members, one of which is designated at reference numeral 206. The grain transport member 202-204 are attached (e.g., mounted, affixed, etc.) to the driving member 206. In some examples, the grain transport member 202-204 are removably, replaceably, etc. mounted to the driving member 206.

Figure 3:
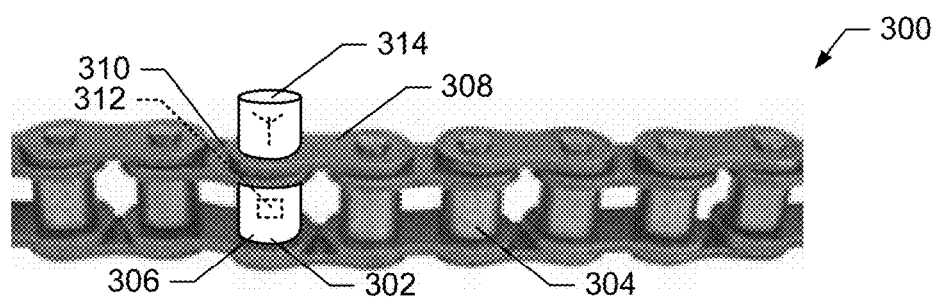
FIG. 3 is an illustration of an example drive member and tension sensor, in accordance with this disclosure, for the example grain elevator of FIG. 2.

In some examples, the driving member 206 is a chain. An example roller chain 300 shown in FIG. 3. may be used to implement the example driving member 206. The example roller chain 300 can be driven by or carried on sprockets, gears, etc. 208 and 209 driven mechanically, hydraulically or by an electric motor (not shown). In the illustrated example of FIG. 2, in use, the sprockets 208, 209 are rotated clockwise by the motor or mechanically or hydraulically driven gearing/belt arrangement, thereby, driving the driving member 206 clockwise. Thus, the example grain transport members 202-204 also move clockwise with the driving member 206, carrying the grain 120B upward on a left side of the grain elevator 200, and returning empty down the right side of the grain elevator 200. As each grain transport member 202-204 passes through the bottom of the grain elevator 200, it scoops up an amount of the grain 120A, and carries it to the top of the grain elevator 200 where it is discharged into the pile of conveyed grain 120C in the grain tank 126.

The weight of the grain 120B being carried upward by the grain transport members 202-204 creates tension in the driving member 206. In some examples, the tension in a left portion 210 of the driving member 206 is used to determine the amount of grain 120B being carried by the grain transport members 202-204. Because the grain transport members 202-204 of the left portion 210 of the driving member 206 are carrying grain, the left portion 210 of the driving member 206 is also referred to as the loaded portion of the driving member 206.

Because the downward moving grain transport members 202-204 are empty, and the sprocket 208 isolates tension in the left portion 210 of the driving member from tension in a right portion 211 of the driving member 206, a greater tension is present in the left portion 210 of the driving member 206 than in the right portion 211 of the driving member 206. Because the grain transport members 202-204 of the right portion 211 of the driving member 206 are empty, the right portion 211 of the driving member 206 is also referred to as the unloaded portion of the driving member 206. In some examples, the difference between the two tensions is used determine the weight of the grain 120B being transported. For example, by computing a difference between a left-side tension (includes grain transport members 202, 203 and grain) and a right-side tension (includes grain transport members 204), the increase in tension due to the weight of the grain 120B can be determined.

To sense tension(s) in the driving member 206, the example grain elevator 200 includes one or more example tension sensors, two of which are designated at reference numerals 212 and 214. In some examples, the tension sensors 212, 214 are force sensing pins, such as those manufactured by Strainsert LLC. In some examples, a force sensing pin 302 (see FIG. 3) replaces a conventional coupling pin 304 of the example roller chain 300. The example force sensing pin 302 includes a portion 306 that mechanically couples adjacent links (e.g., links 308 and 310), and a sensor 312 that senses the tension applied to the portion 306 of the force sensing pin 302 by the links 308 and 310. In some examples, the sensor 312 senses (e.g., measures) a voltage, a current, etc. that represents the tension applied to the portion 306. Thus, the sensor 312 senses the tension in the roller chain 300. Other examples of tension sensors 212, 214 include, but are not limited to, torque pins, strain gauges, etc. An example strain gauge is formed, by, for example, embedding, adhering, or fusing on to the links of roller chain, or on a printed circuit board (PCB) that is coupled between links of a roller chain. In some examples, a chain link is formed of a transducer material.

To obtain tension measurement data from the sensor(s) 312, the example force sensing pin 302 includes an example radio frequency identification (RFID) tag 314 (e.g., a passive RFID tag), and the grain elevator 200 includes one or more example RFID communication devices (e.g., RFID readers), two of which are designated with reference numerals 216 and 218. Example RFID communication devices 216, 218 include devices that can, for example, read data from an RFID tag, read and write data from an RFID tag, energize an RFID tag, etc. When a force sensing pin 302 is proximate to or within range of an RFID communication device 216, 218, the RFID tag 314 draws power from a first radio frequency (RF) signal emitted from the RFID communication device 216, 218. In some examples, the unique identifier (ID) associated with an RFID tag 314, and that it can be communicated with by an RFID communication device 216, 218 is used to identify the location of the RFID tag 314. The RFID tag 314 uses the power or energy induced by the first RF signal in the antenna of the RFID tag 314 for one or more of the following: (1) to activate the sensor 312 to sense a tension or other force data associated with the chain 300 or driving member 206, (2) to record or write force data from the sensor 312 into memory of its corresponding RFID tag 314, (3) to activate tension sensors 214, 216, (4) to record or write force data from the tension sensors 214, 216 into their corresponding RFID tags, and/or (5) to report or transmit wirelessly the sensed tension or force data to the RFID communication device 216, 218 as a representative value in a second RFID signal. In one embodiment, the RFID communication device 216, 218 may read individually an RFID tag with a particular identifier among a pool of identifiers because each identifier has unique identification code or address that is assigned to a corresponding RFID tag. Similarly, the RFID communication device 216, 218 can poll RFID tags (e.g., in a sequence) until all RFID tags associated with the chain 300 or driving member are read. In other embodiments, the RFID communication device 216, 218 may read RFID tags associated with different radio frequency or electromagnetic frequencies of operation to distinguish reading different sensor or tension sensor values associated with the chain 300. In other embodiments, the RFID communication device 216, 218 may update a flag stored in the memory of a corresponding RFID tag to indicate when the RFID tag was last read or that the RFID tag was read properly in a polling sequence. Other example methods and apparatus to communicate sensed tensions include, but are not limited to, near field communication (NFC), active battery-powered low-power wireless sensor arrangement, active low-power sensors incorporating energy harvesting (e.g., by converting vibration to electrical energy through, for example, a piezoelectric, a coil/magnet arrangement, etc.), active sensors powered by wireless power transfer over air-gap, wired communication using slip rings, etc.

To determine the weight of grain being transported by the grain transport members 202-205, the example grain elevator 200 includes an example weight determiner 220. The example weight determiner 220 collects tension measurements in the driving member 206 via the RFID communication devices 216, 218, and determines the weight of grain being transported in the grain elevator 200 based on the collected tension measurements. In some examples, the weight determiner 220 determines the weight of grain being transported in the grain elevator 200 based on a tension sensed in the left-side 210 of the driving member 206. In some examples, the weight determiner 220 uses an example table correlating such left-side tensions with weights of grain 120B to identify the weight of grain 120B being carried given a sensed tension. In some examples, the weight determiner 220 computes a difference between a left-side tension sensed in the left-side 210 (which includes both grain and grain transport members 202-204) and a right-side tension sensed in the right-side 211 of the driving member 206 (which nominally includes just grain transport members 202-204) to determine the weight of the grain. In some examples, the weight determiner 220 uses an example table correlating this difference in tension with weights of grain 120B to identify a weight of grain given a difference between tensions. The contents of the table can be, for example, determined empirically, experimentally, calibrated, theoretically, etc. In the illustrated example of FIG. 2, tension measurements and/or determined weights are stored in a log 222. In some examples, rather than measure tension on the unloaded side, empty paddle tension recoded at the beginning of threshing operation is stored as a reference and used to deduce loading. Thus, in some examples, the need for measuring tension on unloaded side can be eliminated.

In the illustrated example of FIG. 2, a plurality of tension sensors 212, 214 are spaced apart on the driving member 206, and tensions are sensed once per rotation of the driving member 206, as controlled by the weight determiner 220. As shown in FIG. 2, the tensions are sensed when a first group of tension sensors 214 on the left-side 210 (in the orientation of FIG. 2) of the driving member 206 are proximate to the RFID communication device 216, and a second group of tension sensors 212 on the right-side 211 (in the orientation of FIG. 2) of the driving member 206 are proximate to the RFID communication device 218. The tension sensors 212, 214 will be activated by their respective RFID communication device 216, 218 at approximately the same time and, absent measurement inaccuracies, noise, etc. sense the same amount of tension. The weight determiner 220, in some examples, combines (e.g., added together, averaged, etc.) the sensed tensions to reduce measurement noise, etc.

The example weight determiner 220 may be implemented at different locations in a combine harvester. In some examples, the weight determiner 220 is a standalone processor, computer, controller module, etc. In some examples, the weight determiner 220 is implemented as part of another processor of a combine harvester, such as a task computer, host computer, etc. In some examples, the RFID communication devices 216, 218 are communicatively coupled to the weight determiner 220, and/or a computer, processor, etc. implementing the weight determiner 220 via an ICAN™ bus. In some examples, the weight determiner 220 logs, records, tracks, etc. the weight of harvested cleaned grain as the grain is being harvested. Such information can be used to, for example, track, monitor, record, etc. clean grain yield by field, portion of fields, etc. Other example usages include, but are not limited to, determining when the grain tank 126 needs to be emptied, etc.

Figure 4:
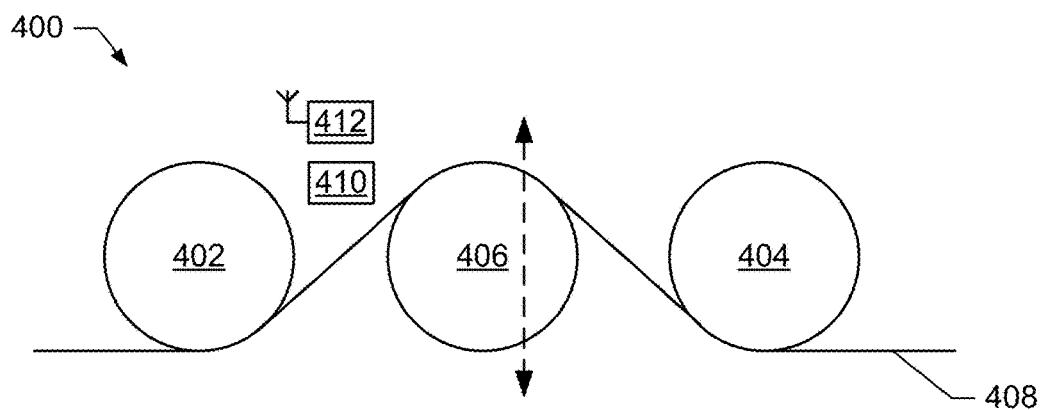
FIG. 4 is a schematic diagram of another example tension sensor, in accordance with this disclosure, for the example grain elevator of FIG. 2.

While an example arrangement of tension sensors 212, 214, and RFID communication devices 216, 218 is shown in FIG. 2, other arrangements may be implemented. Additionally, and/or alternatively, in addition to tension sensors 212, 214 that are mounted to or part of the driving member 206, another example tension sensors include an example roller tension sensor 400 shown in FIG. 4. The example roller tension sensor 400 includes two example rollers 402 and 404 whose axis of rotation do not move, and an example roller 406 whose axis of rotation is able to move up and down. The roller 406 moves downward as the tension in a cable 408 (e.g., the example driving member 206 of FIG. 2) increases, and moves upward as the tension decreases. The amount of up and down deflection of the roller 406 is sensed by a sensor 410 as a representative measure of the tension in the cable 408. In the illustrated example of FIG. 4, the sensor 410 is associated with an RFID tag 412.

Figure 5:
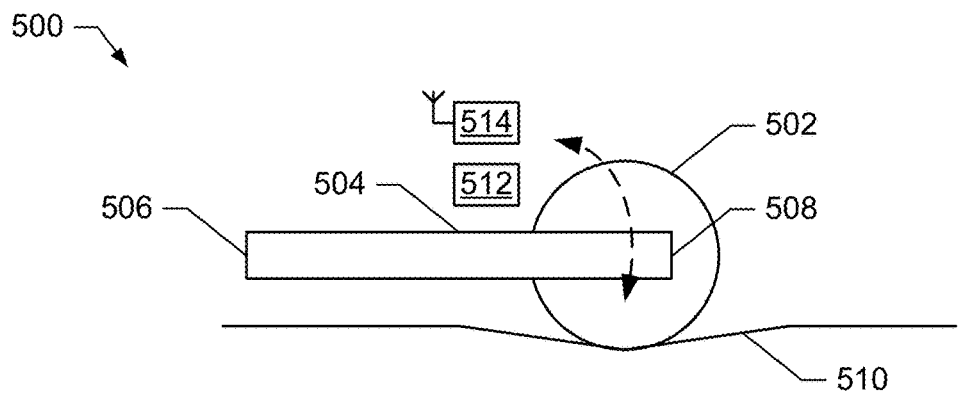
FIG. 5 is a schematic diagram of yet another example tension sensor, in accordance with this disclosure, for the example grain elevator of FIG. 2.

Another example tension sensor 212, 214 includes an example torsion arm assembly 500 shown in FIG. 5. The example torsion arm assembly 500 includes an example roller 502 mounted to an example arm 504. An end 506 of the example arm 504 is fixedly mounted. In the example of FIG. 5, another end 508 of the arm 504 can flex upward and downward in response to tension on a cable 510 (e.g., the driving member 206 of FIG. 2). The end 508 moves upward as the tension in the cable 510 increases, and moves downward as the tension decreases. The deflection of the roller 502 upward and downward is sensed by a sensor 512 as a representative measure of the tension in the cable 510. In the illustrated example of FIG. 5, the sensor 512 is associated with an RFID tag 514.

While an example manner of implementing the grain elevator 102 of FIG. 1 is illustrated in FIG. 2, one or more of the elements, processes and/or devices illustrated in FIG. 2 may be combined, divided, re-arranged, omitted, eliminated and/or implemented in any other way. Further, the example tension sensors 212, 214, the example RFID communication devices 216, 218, the example weight determiner 220, the example sensors 312, 410 and 512, the example RFID tags 314 and/or, more generally, the example grain elevator 200 of FIG. 2 may be implemented by hardware, software, firmware and/or any combination of hardware, software and/or firmware. Thus, for example, any of the example tension sensors 212, 214, the example RFID communication devices 216, 218, the example weight determiner 220, the example sensors 312, 410 and 512, the example RFID tags 314 and/or, more generally, the example grain elevator 200 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate array(s) (FPGA(s)), and/or field programmable logic device(s) (FPLD(s)). When reading any of the apparatus or system claims of this patent to cover a purely software and/or firmware implementation, at least one of the example tension sensors 212, 214, the example RFID communication devices 216, 218, the example weight determiner 220, the example sensors 312, 410 and 512, the example RFID tags 314 and/or, more generally, the example grain elevator 200 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example grain elevator 200 of FIG. 2 may include one or more elements, processes and/or devices in addition to, or instead of, those illustrated in FIG. 2, and/or may include more than one of any or all the illustrated elements, processes and devices.

Figure 6:
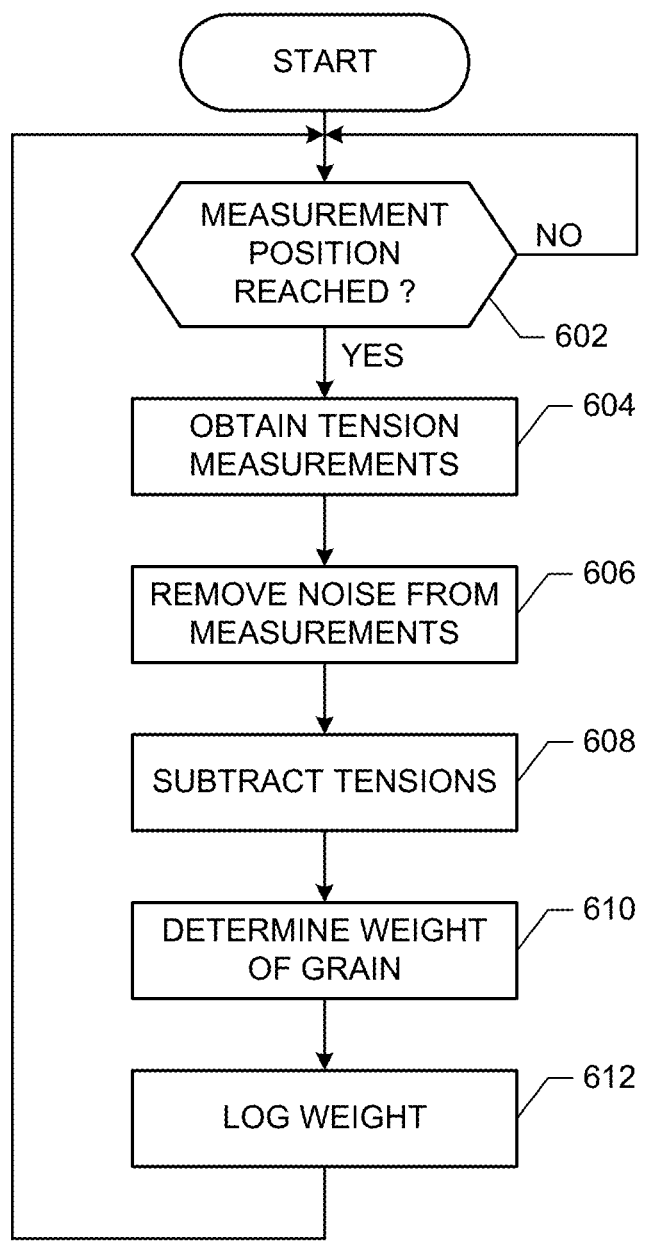
FIG. 6 is a flowchart representing example machine-readable instructions that may be executed to implement the example weight determiner of FIG. 2 to determine the weight of grain in a grain elevator.

A flowchart representative of example machine-readable instructions for implementing the weight determiner 220 of FIG. 2 is shown in FIG. 6. In this example, the machine-readable instructions comprise a program for execution by a processor such as the processor 710 shown in the example processor platform 700 discussed below in connection with FIG. 7. The program may be embodied in software stored on a non-transitory computer readable storage medium such as a CD, a floppy disk, a hard drive, a DVD, a Blu-ray disk, or a memory associated with the processor 710, but the entire program and/or parts thereof could alternatively be executed by a device other than the processor 710 and/or embodied in firmware or dedicated hardware. Further, although the example program is described with reference to the flowchart illustrated in FIG. 6, many other methods of implementing the example weight determiner 220 may alternatively be used. For example, the order of execution of the blocks may be changed, and/or some of the blocks described may be changed, eliminated, or combined. Additionally, and/or alternatively, any or all the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 6 may be implemented using coded instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

The example program of FIG. 6 begins at block 602 the weight determiner 220 waiting for the rotational positional of the driving member 206 at which tension measurements are made (block 602). For example, the weight determiner 220 uses a position sensor, such as a Hall sensor, rotary encoder, a timer, a count of rotations of the sprocket 208, etc. The weight determiner 220 triggers the RFID communication devices 216, 218 to obtain tension measurements from the tension sensors 212, 214, and receives the tension measurements from the RFID communication devices 216, 218 (block 604). In some examples, the weight determiner 220 reduces noise in the tension measurements by combining (e.g., adding, averaging, etc.) them together (block 606). To obtain a tension that reflects just grain, the weight determiner 220 subtracts the right-side tension measurement from the left-side tension measurement (block 608). Using for example, a table lookup, the weight determiner 220 determines the weight of grain in the grain elevator 102, 200 based on the tension difference (block 610). The weight determiner 220 logs the weight of grain in a log, such as the log 222 (block 612).

Figure 7:
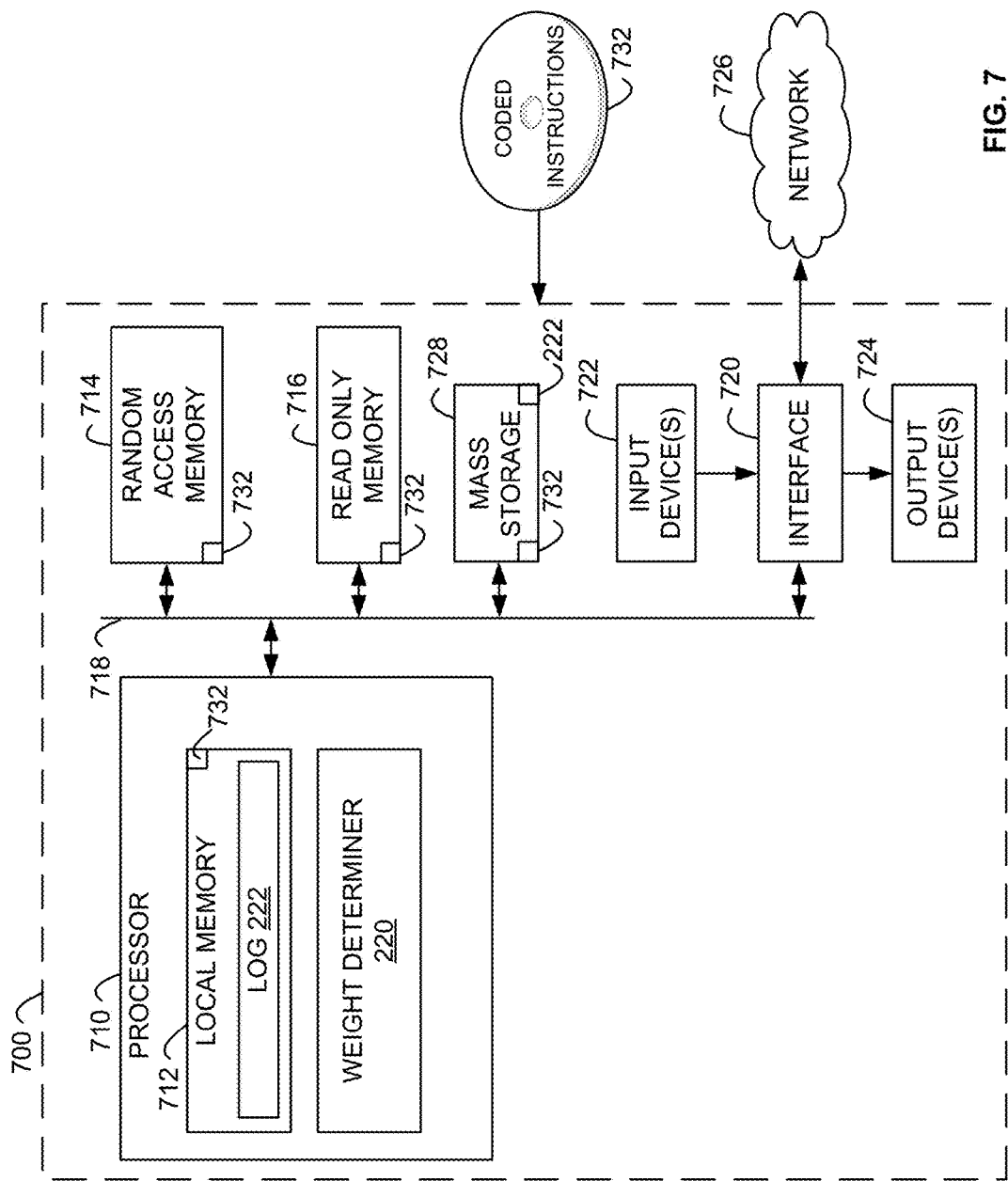
FIG. 7 illustrates an example processor platform structured to execute the example machine-readable instructions of FIG. 6 to implement the example weight determiner of FIG. 2.

FIG. 7 is a block diagram of an example processor platform 700 capable of executing the instructions of FIG. 6 to implement the weight determiner 220 of FIG. 2. The processor platform 700 can be, for example, a server, a personal computer, a mobile device (e.g., a cell phone, a smart phone, a tablet such as an iPad™), a device controller, a control device, or any other type of computing device.

The processor platform 700 of the illustrated example includes a processor 710. The processor 710 of the illustrated example is hardware. For example, the processor 710 can be implemented by one or more integrated circuits, logic circuits, microprocessors, GPUs, DSPs or controllers from any desired family or manufacturer. The hardware processor may be a semiconductor based (e.g., silicon based) device. In this example, the processor implements the weight determiner 220.

The processor 710 of the illustrated example includes a local memory 712 (e.g., a cache). The processor 710 of the illustrated example is in communication with a main memory including a volatile memory 714 and a non-volatile memory 716 via a bus 718. The volatile memory 714 may be implemented by Synchronous Dynamic Random-access Memory (SDRAM), Dynamic Random-access Memory (DRAM), RAMBUS® Dynamic Random-access Memory (RDRAM®) and/or any other type of random-access memory device. The non-volatile memory 716 may be implemented by flash memory and/or any other desired type of memory device. Access to the main memory 714, 716 is controlled by a memory controller (not shown).

The processor platform 700 of the illustrated example also includes an interface circuit 720. The interface circuit 720 may be implemented by any type of interface standard, such as an Ethernet interface, a universal serial bus (USB) interface, an ICAN interface, a BLUETOOTH® interface, a near field communication (NFC) interface, and/or a peripheral component interface (PCI) express interface.

In the illustrated example, one or more input devices 722 are connected to the interface circuit 720. The input device(s) 722 permit(s) a user to enter data and/or commands into the processor 710. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-plane switching (IPS) display, a touchscreen, etc.) a tactile output device, a printer, and/or speakers. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, and/or network interface to facilitate exchange of data with external machines (e.g., computing devices of any kind) via a network 726 (e.g., a satellite communication system, a cellular communication system, a Wi-Fi system, etc.). In such examples, the interface circuit 820 includes a radio frequency (RF) module, antenna(s), amplifiers, filters, modulators, etc.

The processor platform 700 of the illustrated example also includes one or more mass storage devices 728 for storing software and/or data. Examples of such mass storage devices 728 include floppy disk drives, hard drive disks, CD drives, Blu-ray disk drives, and DVD drives.

Coded instructions 732 including the coded instructions of FIG. 6, and/or the log 222 may be stored in the mass storage device 728, in the volatile memory 714, in the non-volatile memory 716, and/or on a removable non-transitory computer-readable storage medium such as a compact flash drive, a CD or DVD.

"Including" and "comprising" (and all forms and tenses thereof) are used herein to be open ended terms. Thus, whenever a claim lists anything following any form of "include" or "comprise" (e.g., comprises, includes, comprising, including, having, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended. Conjunctions such as "and," "or," and "and/or" are inclusive unless the context clearly dictates otherwise. For example, "A and/or B" includes A alone, B alone, and A with B. In this specification and the appended claims, the singular forms "a," "an" and "the" do not exclude the plural reference unless the context clearly dictates otherwise.

Any references, including publications, patent applications, and patents, cited herein are hereby incorporated by reference to the same extent as if each reference were individually and specifically indicated to be incorporated by reference and were set forth in its entirety herein.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A grain elevator, comprising:
   grain transport members to transport grain;
   a driving member to move the grain transport members, the driving member having a first side and a second side opposite the first side, the first side of the driving member to move the grain transport members in an upward direction, the second side of the driving member to move the grain transport members in a downward direction;
   a first tension sensor on the first side to sense a first tension in the first side of the driving member;
   a second tension sensor on the second side to sense a second tension in the second side of the driving member; and
   a weight determiner to determine a weight of the grain based on the first and second tensions.

2. The grain elevator of claim 1, wherein the first tension sensor includes a radio frequency identification (RFID) tag mounted to at least one of the driving member or the first tension sensor, and further including:
   an RFID communication device to, when the RFID tag is proximate to the RFID communication device, wirelessly provide power to the RFID tag to power the first tension sensor, and obtain from the RFID tag a value representative of the first tension.

3. The grain elevator of claim 1, wherein the driving member includes a roller chain, and the first tension sensor includes a force sensing pin having a sensor to sense the first tension, the force sensing pin coupled between two links of the roller chain.

4. The grain elevator of claim 1, wherein the driving member includes a roller chain, and the first tension sensor includes a strain gauge having a sensor to sense the first tension, the strain gauge coupled between two links of the roller chain.

5. The grain elevator of claim 1, wherein at least one of the first tension sensor or the second tension sensor includes at least one of a roller tension sensor or a torsion arm sensor.

6. The grain elevator of claim 1, wherein the first side is a loaded side of the driving member and the second side is an unloaded side of the driving member, the first tension is associated with a first weight of the grain on the loaded side of the driving member, the second tension is associated with a second weight of one or more grain transport members on the unloaded side of the driving member, and the weight determiner is to determine the weight of the grain by comparing a difference between the first tension and the second tension to a table.

7. The grain elevator of claim 1, further including:
   a third tension sensor on the first side of the driving member to sense a third tension in the first side of the driving member; and
   a fourth tension sensor to sense a fourth tension in the second side of the driving member.

8. The grain elevator of claim 7, wherein the weight determiner is to:
   add the first and third tensions to form a first sum;
   add the second and fourth tensions to form a second sum;
   subtract the second sum from the first sum to determine a difference; and
   determine the weight of the grain based on the difference.

9. A method, comprising:
   measuring a first tension in a first side of a driving member in a grain elevator with a first tension sensor on the first side, the first side of the driving member to move one or more grain transport members to transport grain in an upward direction;
   measuring a second tension in a second side of the driving member with a second tension member on the second side, the second side of the driving member to move one or more grain transport members in a downward direction; and
   determining a weight of the grain based on the first tension and the second tension.

10. The method of claim 9, further including operating the driving member to move the one or more grain transport members to move the grain in the grain elevator, where the first tension and the second tension are sensed while the driving member is operating.

11. The method of claim 9, wherein the first side is a loaded portion of the driving member, the second side is an unloaded portion of the driving member, the first tension is associated with a first weight of the grain of the loaded portion, the second tension is associated with a second weight of one or more grain transport members, and further including determining the weight of the grain based on comparing a difference between the first and second tensions to a table.

12. The method of claim 9, further including:
    measuring a third tension in the first side of the driving member; and
    measuring a fourth tension in the second side of the driving member.

13. The method of claim 12, further including:
    adding the first and third tensions to form a first sum;
    adding the second and fourth tensions to form a second sum;
    subtracting the second sum from the first sum to determine a difference; and
    determining the weight of the grain based on the difference.

14. The method of claim 9, further including:
    emitting a first radio frequency identification (RFID) signal to provide power to the first tension sensor, the first tension sensor to sense the first tension when the power is provided; and
    receiving a second RFID signal from the first tension sensor, the second RFID signal corresponding to a value representative of the first tension.

15. A non-transitory computer-readable storage medium comprising instructions that, when executed, cause a machine to at least:
    measure a first tension in a first side of a driving member in a grain elevator with a first tension sensor on the first side, the first side of the driving member to move one or more grain transport members to transport grain in an upward direction;

measure a second tension in a second side of the driving member with a second tension sensor on the second side, the second side of the driving member to move one or more grain transport members in a downward direction; and determine a weight of the grain based on the first tension and the second tension.

16. The non-transitory computer-readable storage medium of claim 15, wherein the instructions, when executed, cause the machine to operate the driving member to move the one or more grain transport members to move the grain in the grain elevator, where the first tension and the second tension are sensed while the driving member is operating.

17. The non-transitory computer-readable storage medium of claim 15, wherein the first side is a loaded portion of the driving member, the second side is an unloaded portion of the driving member, the first tension is associated with a first weight of the grain of the loaded portion, the second tension is associated with a second weight of one or more grain transport members, and the instructions, when executed, cause the machine to determine the weight of the grain by comparing a difference between the first and second tensions to a table.

18. The non-transitory computer-readable storage medium of claim 15, wherein the instructions, when executed, cause the machine to:

measure a third tension in the first side of the driving member; and measure a fourth tension in the second side of the driving member.

19. The non-transitory computer-readable storage medium of claim 15, wherein the instructions, when executed, cause the machine to:

activate a radio frequency identification (RFID) communication device to generate a first RFID signal to provide power to the first tension sensor, the first tension sensor to sense the first tension when the power is provided; and obtain a second RFID signal from the first tension sensor, the second RFID signal corresponding to a value representative of the first tension.

\* \* \* \* \*